Feb. 21, 1933.    M. L. HOLLOWAY    1,898,447
FRONT WHEEL DRIVE HOUSING
Filed Feb. 10, 1932    2 Sheets-Sheet 1

Inventor
M. L. Holloway
By Clarence A. O'Brien
Attorney

Feb. 21, 1933.   M. L. HOLLOWAY   1,898,447
FRONT WHEEL DRIVE HOUSING
Filed Feb. 10, 1932   2 Sheets-Sheet 2

Inventor
M. L. Holloway
By Clarence A. O'Brien
Attorney

Patented Feb. 21, 1933

1,898,447

UNITED STATES PATENT OFFICE

MYNARD L. HOLLOWAY, OF LA PORTE, INDIANA

FRONT WHEEL DRIVE HOUSING

Application filed February 10, 1932. Serial No. 592,206.

This invention appertains to new and useful improvements in housings adapted to protect gearing and more particularly for gearing of the front wheel drive type.

The principal object of this invention is to provide means permitting a greater degree of turn in the steering mechanism of front wheel drive mechanisms.

Another important object of the invention is to provide a housing for front wheel drive gearing which will permit lubrication in a thorough and satisfactory manner.

Another important object of the invention is to provide a housing for front wheel drives which is flexible and automatically movable in accordance with the motion of the driving connections.

These and other important objects and advantages of the invention will become apparent to the reader of the following specification.

In the drawings:—

Figure 1:
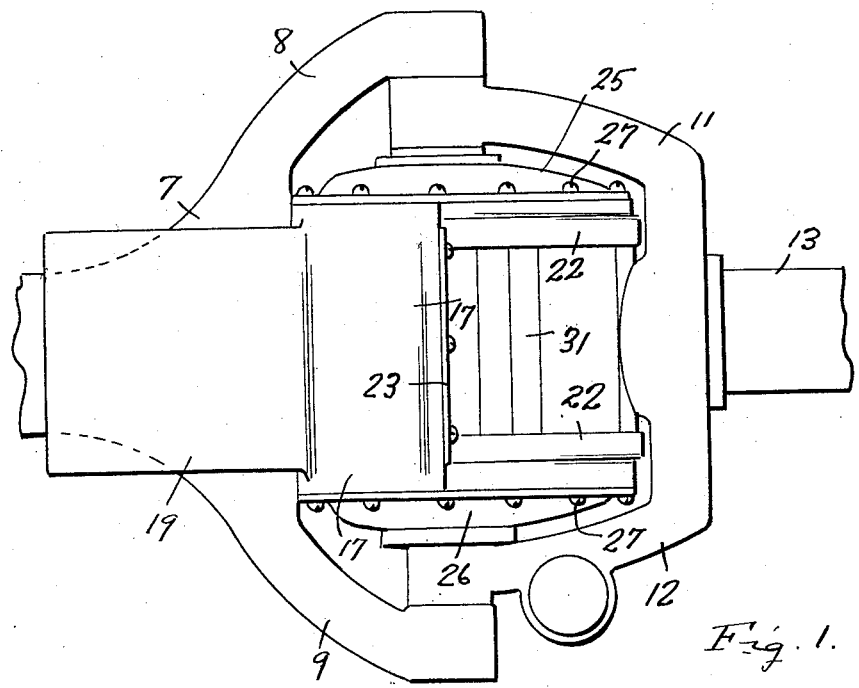
Figure 1 represents a side elevational view of the front wheel drive housing installed on a front wheel drive connection.

Referring to the drawings wherein like numerals designate like parts, it can be seen that numeral 5 represents the front axle section extending from the differential (not shown) while numeral 6 shows the stub axle corresponding to the axle section 5 and which serves to drive one of the front wheels (not shown).

Numeral 7 represents the housing for the axle section 5 which is provided with a fork having the upper and lower fingers 8 and 9 respectively connected by the vertically extending pivot 10, which also passes through the upper and lower fingers 11 and 12 respectively of the fork carried by the sleeve 13 which surrounds the stub axle 6 and which is connected to the brake drum which is not shown in the drawings.

Numerals 14 and 15 represent the beveled gears on the inner ends of the shafts 5 and 6 respectively, while numeral 16 represents the intermediate beveled gear which meshes with the gears 14 and 15, and which idles on the pivot pin 10.

Figure 3:
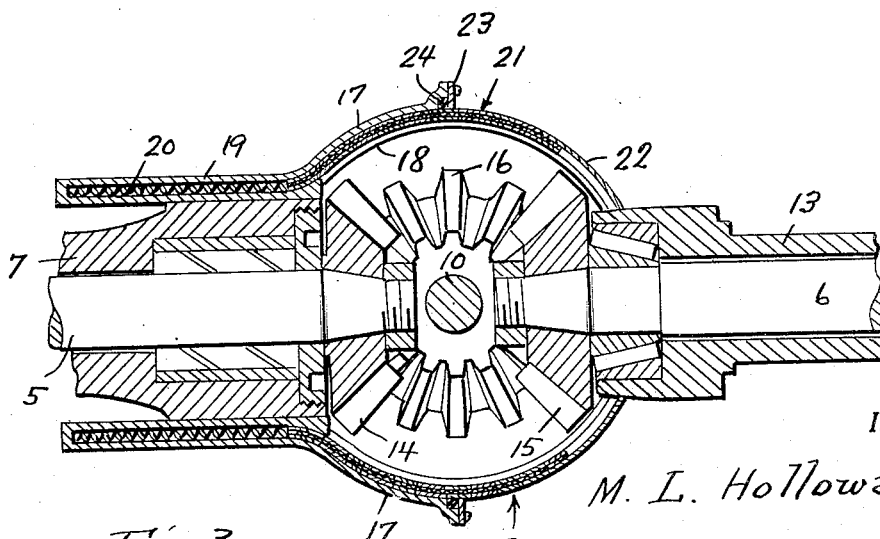
Fig. 3 represents a horizontal sectional view through a front wheel drive connection with the housing installed thereon.

In carrying out the present invention, the fork of the housing 7 has within its confines a pair of arcuate laterally extending walls 17—17 each of which is provided with a guideway 18. Each of these walls 17 and its companion guideway 18 merges with an outwardly extending pocket structure 19 and in each of these pocket structures 19 are one or more coiled springs 20 for exerting pressure against the inner end of its complementary shutter unit 21. These shutter units ride in the extension 22 of the guides 18 (see Fig. 3).

A detachable strip 23 is provided on the outer edge of each of the walls 17 for retaining a packing strip 24 in a position wiping against the outside of the corresponding shutter 21.

The walls 17—17 along with their companion guides 18 and guide extensions 22 form a supporting structure for the upper cap 25 and the lower cap 26 which are secured to the aforementioned details by screws 27.

Figure 4:
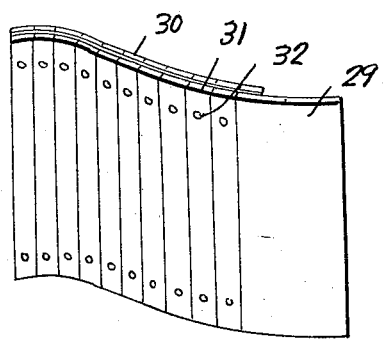
Fig. 4 represents a side elevational view of one shutter unit of the housing.
Figure 2:
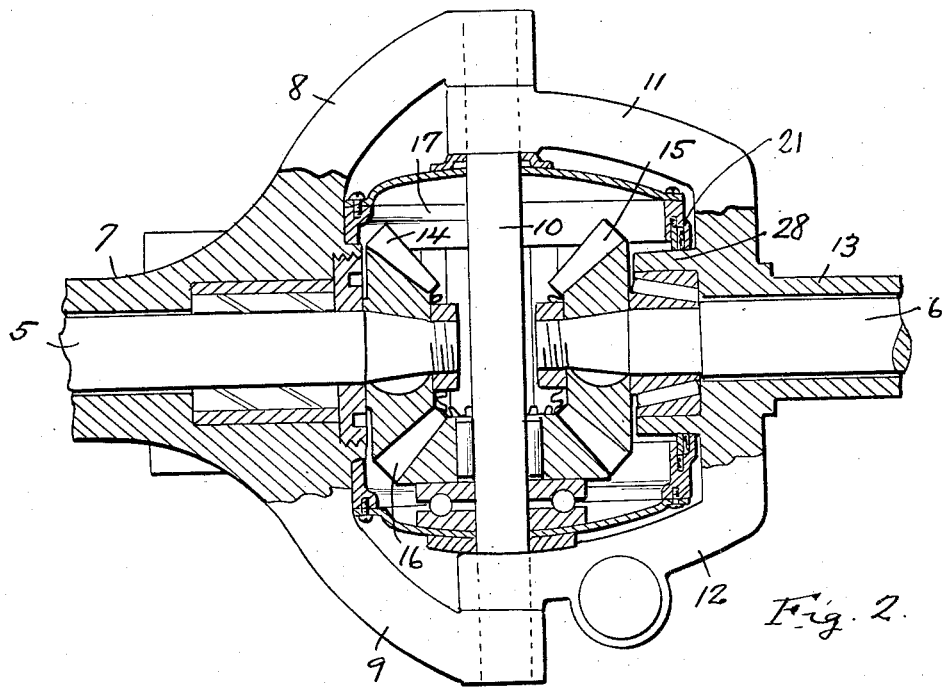
Fig. 2 represents a vertical sectional view through a front wheel drive connection showing the housing installed thereon.

The outer ends of each of the shutter units 21 abuts the bearing collar 28 on the housing 13 (see Fig. 2). Each of these shutter units 21 consists of a transversely arcuate vertically disposed end plate 29 to one vertical edge portion of which is secured the flexible sheet (or plurality of parallel tapes) denoted by numeral 30 and as is clearly shown in Fig. 4, a multiplicity of slats 31 are secured to opposite sides of this sheet 30 by suitable means 32 to obviously reinforce the sheet.

The sheet 30 serves as a flexible carrier for the slats and the entire unit is obviously flexible so that it can ride in the corresponding wall guide 18 which is arcuate and eased into its corresponding pocket 19 against the tension of its associated springs 20.

With this housing used on the gearing front wheel drives or in fact around gearing of any type the gearing will be protected from foreign matter that may cause improper operation thereof with consequent injury to the teeth of the gear wheels involved.

While the foregoing specification sets forth the invention in specific terms, it is to be understood that numerous changes in the shape, size and materials may be resorted to without departing from the spirit and scope of the invention as claimed hereinafter.

Having thus described my invention, what I claim as new is:—

1. In a swingable geared connection, a drive shaft, a driven shaft, a housing for the drive shaft, a housing for the driven shaft, a flexible housing interposed between opposite ends of the housing to encompass the geared connection, said housing comprising a pair of flexible slidable shutters and guide means for the said shutters, a pocket for each of the shutters, extending from the shutters, and spring means in the pocket for normally urging the shutters outwardly in the guide to tensionally engage at their outer ends against one of the housings.

2. In a swingable geared connection, a drive shaft, a driven shaft, a housing for the drive shaft, a housing for the driven shaft, a flexible housing interposed between opposite ends of the housing to encompass the geared connection, said housing comprising a pair of slidable flexible shutters, a pocket for each of the shutters, guide means for each of the shutters extending from the pockets, and spring means in the pockets for normally urging the shutters outwardly and in the guides to tensionally engage at their outer ends against one of the housings.

3. In a swingable geared connection, a drive shaft, a driven shaft, a housing for the drive means, a housing for the driven shaft, a flexible housing interposed between opposite ends of the housings to encompass the geared connection, said flexible housing comprising a flexible shutter including a flexible sheet of material having a plurality of slats secured to opposite sides thereof in contacting relation.

In testimony whereof I affix my signature.

MYNARD L. HOLLOWAY.